United States Patent [19]

Knothe et al.

[11] Patent Number: 4,758,069

[45] Date of Patent: Jul. 19, 1988

[54] METHOD AND APPARATUS FOR ACTUATING A LIQUID CRYSTAL DISPLAY WITH RECOGNITION OF FUNCTIONAL ERRORS

[75] Inventors: Erich Knothe, Eddigehausen; Franz-Josef Melcher, Hardegsen; Christian Oldendorf, Göttingen, all of Fed. Rep. of Germany

[73] Assignee: Sartorius GmbH, Fed. Rep. of Germany

[21] Appl. No.: 860,576

[22] Filed: May 7, 1986

[30] Foreign Application Priority Data

May 7, 1985 [DE] Fed. Rep. of Germany ....... 3516298

[51] Int. Cl.[4] ......................... G02F 1/13; G09G 3/18; G09G 3/36

[52] U.S. Cl. .................................... 350/332; 350/335; 340/784; 340/765

[58] Field of Search ................ 350/332, 335; 340/765, 340/784; 368/82, 84, 10, 236, 239, 242

[56] References Cited

U.S. PATENT DOCUMENTS 4,065,764 12/1977 Houryu .............................. 350/332
4,236,150 11/1980 Chern .................................. 340/765
4,241,344 12/1980 Kmetz et al. ....................... 340/765
4,247,852 1/1981 Utzinger ............................. 340/765

FOREIGN PATENT DOCUMENTS 0011134 10/1979 European Pat. Off. .
0135331 3/1985 European Pat. Off. .

*Primary Examiner*—Stanley D. Miller
*Assistant Examiner*—Trong Quang Phan
*Attorney, Agent, or Firm*—Eric P. Schellin

[57] ABSTRACT

The invention is relative to a method of statically (non-multiplexed) actuating a liquid crystal display which comprises several segments and a common back electrode, using a microprocessor which serially outputs the data to be displayed, and using a serial/parallel converter which statically makes the data to be displayed available for each segment of the liquid crystal display. The invention has the task of achieving recognition of functional error as follows: The data to be displayed is outputted approximately every 0.1 second by the microprocessor and the data for the individual segments and for the back electrode is inverted at every second data output. The failure of components then results in a blinking of the particular segment and is conspicuously indicated in this manner. In the case of alternating voltage actuation of the liquid crystal display, it is advantageous if the clock pulse of the alternating voltage actuation is also inverted at every second data output.

7 Claims, 4 Drawing Sheets

METHOD AND APPARATUS FOR ACTUATING A LIQUID CRYSTAL DISPLAY WITH RECOGNITION OF FUNCTIONAL ERRORS

BACKGROUND OF THE INVENTION

The invention is relative to a method of statically actuating a liquid crystal display which comprises several segments and a common back electrode, using a microprocessor which serially outputs the data to be displayed, and using a serial/parallel converter which statically makes the data to be displayed available for each segment of the liquid crystal display.

Methods of this type are generally known. The concept "static actuation" is used in this connection as a contrast to multiplex operation. Static actuation has the advantage of better contrast and a greater angle of view when compared with multiplex actuation. A disadvantage, however, is the fact that the failure of individual components or connections in the actuation electronics can result in the failure of individual segments, so that, for example, false numbers can occur in 7-segment digital displays. Known methods for preventing this, such as are described, for example, in European patent application No. 0,011,134, are always based on a multiplex operation.

The invention therefore has the task of indicating a method which makes it possible to recognize functional errors even in a static actuation of the liquid crystal segments.

BRIEF DESCRIPTION OF THE INVENTION

The invention achieves this task as follows: The data to be displayed is outputted every 0.05 seconds to 0.5 seconds anew by the microprocessor and the data for the individual segments and for the back electrode is inverted at every second data output.

The invention thus makes use of the fact that liquid crystal displays vary their optical transmission in comparison to the dead state, e.g. both in the case of positive potential on the segment and zero potential on the back electrode as also in the case of zero potential on the segment and positive potential on the back electrode. If there is a cyclic switching between these two actuations, the observer does not notice this, provided that all components and connections are in order. If, however, a memory flip-flop in the display memory is defective, for example, this segment is actuated only in every second display cycle and will therefore blink. This blinking is readily recognized and is noticed at once by any observer, especially if it is in the frequency range of a few hertz. It is therefore preferable to set the time of a display cycle at 0.1 second, so that in the case of an error a blinking frequency of 5 Hz results. This blinking frequency must not coincide with the data repetition frequency in measuring devices which display new data cyclically in any case, such as for example, meters, digital voltmeters or balances, since otherwise, for example, in a 7-segment display the failure of the lower left segment can not be distinguished from a fluctuation of the date between 8 and 9.

Usually, the actuation of the individual segments and of the back electrode in a liquid crystal display is inverted at a clock frequency of 30 to 100 Hz, usually about 40 Hz. In this instance it is advantageous to also invert the clock pulse of the alternating voltage actuation together with inverting of the display data at every second data output in order to avoid a longer period on the segments during the change of actuation.

BRIEF DESCRIPTION OF THE DRAWINGS

The invention is described below with reference made to the figures.

Figure 1:
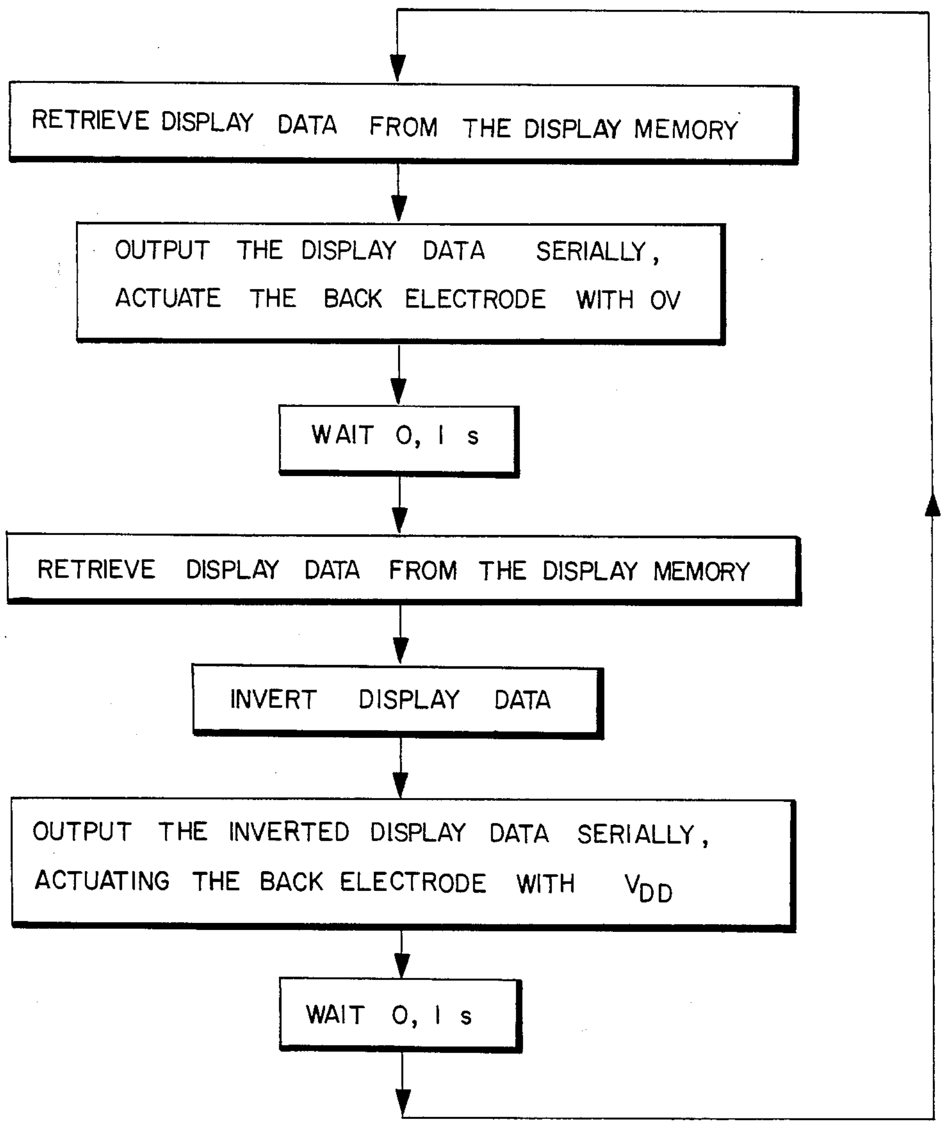
FIG. 1 shows the principle of the invention in a flow chart.

The flow chart of FIG. 1 shows the principle of the invention as a command sequence for the microprocessor. The display data is retrieved by the microprocessor from the display memory and serially outputted to the serial/parallel converter. The serial/parallel converter then makes this data available in a parallel manner for the individual segments. At the same time, the microprocessor puts the back electrode on zero potential and retains this state 0.1 second. During this time, all segments are optically activated which a logical "1" as display data and are thus on the potential of the supply voltage $V_{DD}$. After the 0.1 second has elapsed, the microprocessor again retrieves the display date from the display memory, inverts this data and outputs it serially to the serial/parallel converter. At the same time, the microprocessor puts the back electrode on the $V_{DD}$ potential and retains this state likewise for 0.1 second. In this manner, all segments are optically activated in this time which have a logical "0" as display data. On account of the inverting of the display data, these are precisely the same segments which were optically activated during the first 0.1 second.

Figure 2:
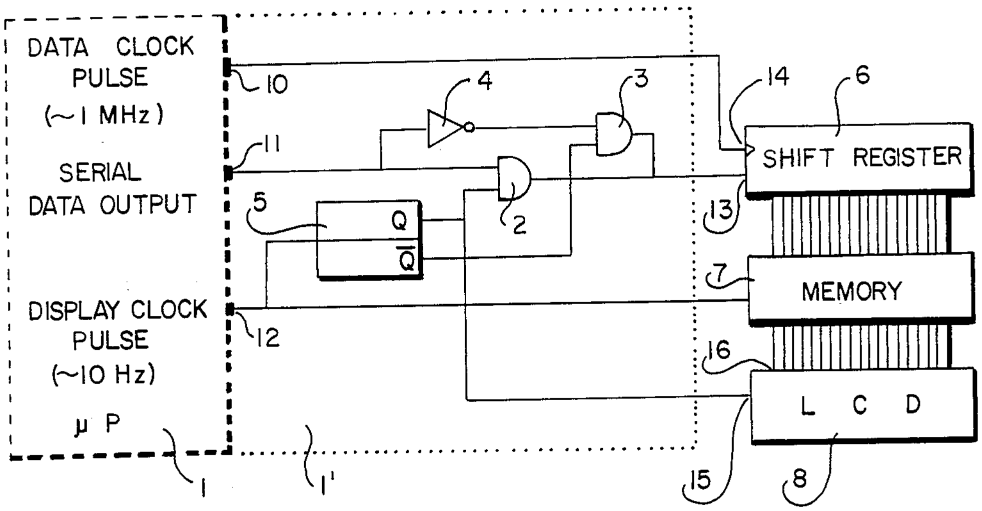
FIG. 2 shows the block diagram associated with the flow chart of FIG. 1.

FIG. 2 shows a possible circuit for creating this sequence of operations as a block diagram. Microprocessor 1 serially outputs the display data at output 11. During the first output, flip-flop 5 is positioned in such a manner, for example, that output Q is activated and gate 2 is open therewith. Due to this, the display data passes from output 11 of the microprocessor directly into data input 13 of shift register 6. The data clock pulse which belongs to the serial data passes directly from output 10 of the microprocessor to shift input 14 of the shift register and thus controls the serial transfer of data into the shift register. After termination of the data transfer, the microprocessor puts a short impulse on output 12, therewith causing memory 7 to retrieve the parallel data of shift register 6 and pass it on to the segments (connections 16) of liquid crystal display 8. Shift register 6 and memory 7 together form the serial/parallel converter. Moreover, flip-flop 5 is thrown over by the impulse on output 12 of the microprocessor, output Q goes to zero potential and the back electrode (connection 15) of liquid crystal display 8 is also put on zero volts therewith. At the same time, gate 2 is closed and gate 3 opened, so that during the following transfer of display data from output 11 of the microprocessor to data input 13 of shift register 6, inverter 4 is cut in. The transfer of the display data can occur in this circuit at any time within the waiting time of 0.1 second. At the end of the waiting time of 0.1 second, a short impulse appears again on output 12 of microprocessor 1 which causes memory 7 to retrieve the new, inverted display data from shift register 6 and pass it on to the segments of the liquid crystal display. At the same time, flip-flop 5 falls over and output Q goes to $V_{DD}$, so that the potential of $V_{DD}$ is on the back electrode of the liquid crystal display. This causes both the potentials of the segments and the potential of the back electrode to be inverted, so that a difference of potential is again on the same segments and these segments are therefore optically activated.

Figure 3:
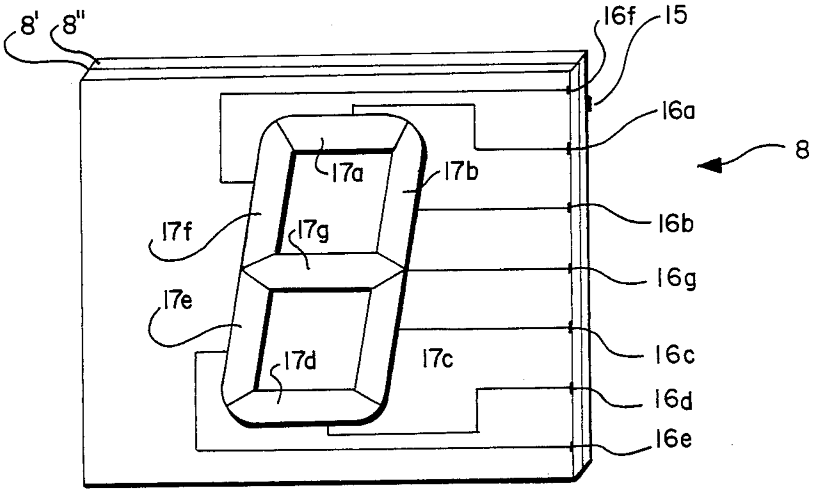
FIG. 3 shows a 7-segment digit.

FIG. 3 shows a 7-segment digit as example for liquid crystal display 8. Segments 17*a* . . . 17*g* are vapor-deposited as conductive electrodes onto front glass plate 8 and conductively connected to connections 16*a* . . . 16*g* at the edge. The back electrode is on rear glass plate 8" and is contacted at 15. The nematic liquid, whose optical transmission changes at a difference of potential, is located between the two glass plates. Liquid crystal displays of this type are generally known, so that they do not need to be described in detail here.

The method described above for actuating a liquid crystal display makes it possible for errors in shift register 6, in memory 7 and also, to a large extent, errors in the supply lines to the individual segments 17*a* . . . 17*g* to be recognized by an observer by the blinking of the appropriate segment. If, for example, a segment is constantly at a fixed potential, e.g. because a memory flip-flop in memory 7 has failed, this results in a blinking of this segment on account of the changing potential of the back electrode. If the back electrode is at fixed potential, the entire number to be displayed blinks. Even short circuits on the supply line, which result in a constant potential of the associated segment, are expressed in precisely the same manner by blinking. Only line disconnections are not recognized, since they result in a failure of this segment independently of the potential of the counterelectrode. However, in order to recognize these errors, the known "figure-eight check", which activates all segments, has already been introduced. All errors which occur within the serial data processing, that is, before shift register 6, generally result on account of the serial processing in a total failure of the data. Parallel structures inside the microprocessor, such as, for example, memories, are generally protected by check bits or other known methods, so that the described method achieves a global protection against non-recognizable malfunctions.

The blinking of the display is perceived most clearly by the observer if the blinking frequency is approximately 5 Hz. Therefore, the duration of a display cycle is preferably 0.1 second, that is, the inverted and the non-inverted potential are present 0.1 second each. However, up to 10 Hz and down to 1 Hz are also recognized, that is the inverted and the non-inverted potentials can be between 0.05 and 0.5 second.

In FIG. 2, flip-flop 5, inverter 4 and gates 2, 3 are shown as discrete components outside microprocessor 1 for the sake of clarity. Their functions can, of course, also be performed by software inside the microprocessor, so that the microprocessor can also comprise area 1', as is indicated in FIG. 2 with dotted lines.

Figure 4:
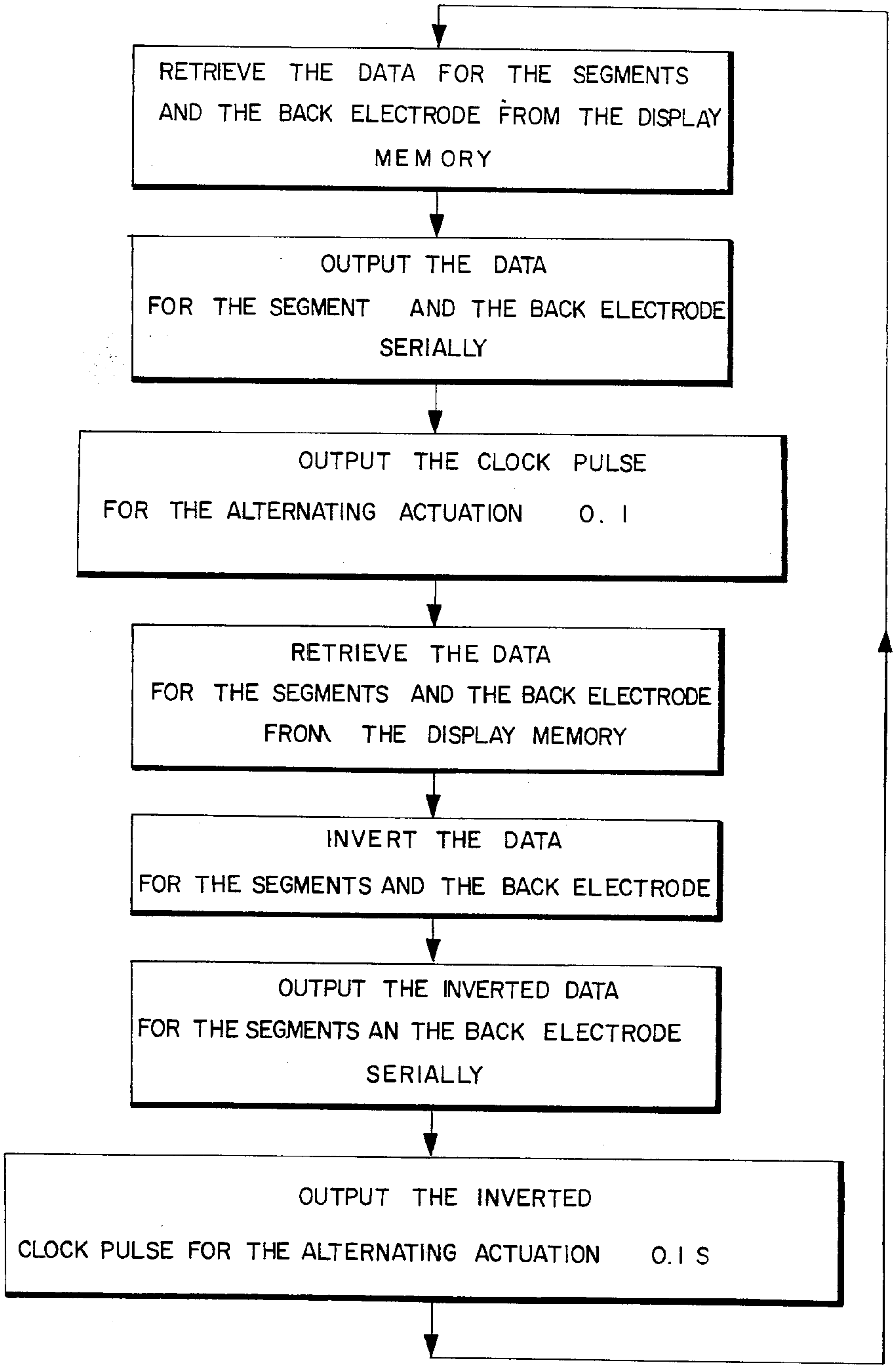
FIG. 4 shows a flow chart from an alternating voltage actuation of a liquid crystal display.
Figure 5:
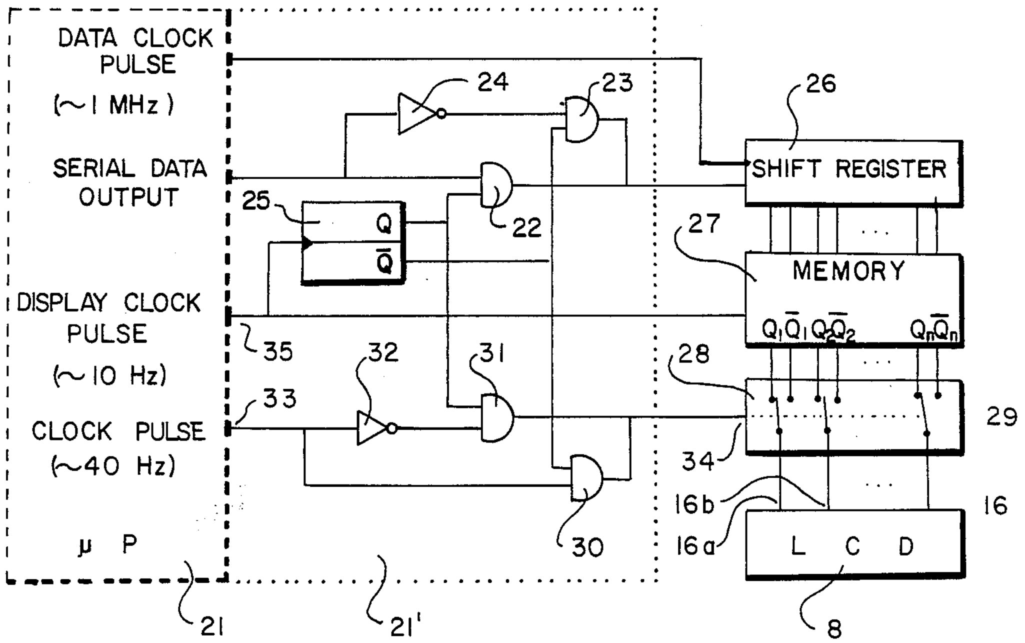
FIG. 5 shows the block diagram associated with the flow chart of FIG. 4.

An embodiment of the actuation of the liquid crystal display with alternating voltage actuation is shown in the form of a flow chart of the instructions to the microprocessor in FIG. 4 and in FIG. 5 as a block diagram of a suggested embodiment. The data to be displayed is retrieved by microprocessor 21 again from the display memory, serially outputted and read into shift register 26. During the first display cycle, flip-flop 25 is positioned so that output Q is activated so that gate 22 is opened and the display data passes without inverting into shift register 26. It is assumed in the embodiment of FIGS. 4 and 5 that the potential for the back electrode is also serially written into shift register 26 as a data bit, e.g. as the last one. After the end of the data transfer, a short impulse appears on output 35 of microprocessor 21 which causes memory 27 to retrieve the data from shift register 26. At the same time, flip-flop 25 is thrown over, gate 22 is blocked and, instead of it, gate 23 is opened, so that at the next transfer of the display data, inverter 24 is cut in. Furthermore, flip-flop 25 opens gate 30, so that a pulse train with a repetition frequency of approximately 40 Hz passes from output 33 of microprocessor 21 via gate 30 to input 34 of alternation switch 28. This pulse train cyclically switches over change-over switch 29, so that both the potentials of the segments and the potential of the back electrode are cyclically switched over. If, for example, outputs $Q_1$, $\overline{Q}_2$ and $Q_n$ are at $V_{DD}$ and outputs $Q_1$, $Q_2$ and $\overline{Q}_n$ are therewith at zero, then in the position of change-over switch 29 shown, voltage $V_{DD}$ is on connection 16*a* of segment 17*a* (cf. also FIG. 3), zero potential is on connection 16*b* of segment 17*b* and voltage $V_{DD}$ is on back electrode 15. This optically activates segment 17*b* but not segment 17*a*. If change-over switch 29 switches over, then zero potential is on connection 16*a* of segment 17*a*, voltage $V_{DD}$ on connection 16*b* of segment 17*b* and zero potential on back electrode 15. Thus, segment 17*b* is again optically activated, since its connection 16*b* has a difference of potential in relation to back electrode 15 and segment 17*a* remains optically inactive. Thus, the cyclic switching over the change-over switch 29 does not change the optical activation of the individual segments serves only to prevent polarization events in the nematic liquid of the liquid crystal display.

The state just described with the given data content of memory 27 and the cyclic switching over of change-over switch 29 is retained 0.1 second according to the flow chart in FIG. 4. Microprocessor 21 again outputs the display data serially at any time within this 0.1 second, which, however, travel this time via inverter 24 and gate 23, that is, they arrive inverted in shift register 26. When the pulse appears at output 34 of microprocessor 21, the inverted data is retrieved into memory 27. In the example given above, therefore, in this second display cycle outputs $Q_1$, $\overline{Q}_2$ and $Q_n$ would be at zero and outputs $\overline{Q}_1$, $Q_2$ and $Q_n$ at $V_{DD}$. This reactivates segment 17*b* optically, since it has a different potential each time in comparison to back electrode 15, while segment 17*a* remains optically inactive, since it has the same potential each time as the back electrode. Furthermore, in FIG. 5 gate 30 is closed by the other position of flip-flop 25 in the second display cycle and gate 31 is opened instead, so that the pulse train travels from output 33 of the microprocessor via inverter 32 to input 34 of alternating switch 28. Since all pulses in microprocessor 21 are derived from the same high-frequency clock pulse, the pulses are also synchronized with each other on outputs 33, 35. Thus, if change-over switches 29 begin, e.g. in the first display cycle, in the position shown in FIG. 5 and end in the opposite position, then they begin in the second display cycle with the position not shown in FIG. 5 and end with the position shown in FIG. 5.

Figure 6:
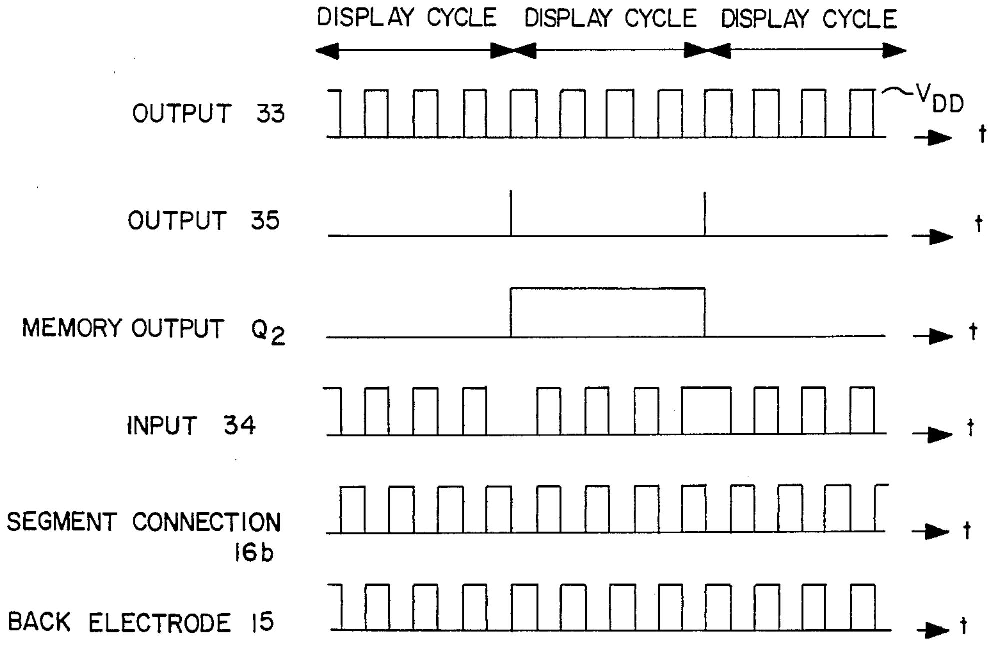
FIG. 6 shows an impulse diagram for the block diagram of FIG. 5.

This double inverting, whereby on the one hand the display data is inverted in memory 27 and on the other hand the actuation of change-over switch 29 is inverted, produces an alternating voltage without phase jump on connections 16*a* . . . 16*g* of segments 17*a* . . . 17*g* and on back connection 15, as is shown again in detail in FIG. 6. The pulse train on output 33 consists of regular pulses whose pulse duration is equal to the duration of the pauses. The pulse on output 35 defines the end of the particular display cycle and the start of the next display cycle. Due to the inverting of the display data, the potential changes on output $Q_2$ of memory 27, selected by way of example. At the same time, the pulse train from output 33 is also inverted, so that the inverse pulse train appears on input 34 of alternation switch 28. Both inversions result in a regular alternating voltage on the output of alternation switch 28 again, as is shown in the example of segment 17*b* and 17*b* with its connection 16*b* and in the example of back electrode 15.

In this embodiment explained in FIGS. 4 to 6, errors in shift register 26, memory 27 and alternation switch 28 are again displayed to the user by a blinking of the particular segments or digits. Errors in the supply lines to the liquid crystal display which produce a lesser contrast (at constant potential of the supply line) or (in the case of an interrupted supply line) result in a permanent failure of the segment are again recognized by the "figure-eight check".

As was the case in the first embodiment, circuit area 21' can be performed with software by microprocessor 21 in this embodiment of FIG. 5.

The invention explained by way of example for a 7-segment digit is of course also suitable for any number of 7-segment digits or for alphanumeric displays, e.g. with matrix presentation. The length of the shift register and the number of the memory elements and, if necessary, the number of the change-over switches need only be selected in an appropriate manner.

We claim:

1. Method of statically actuating a liquid crystal display which comprises the steps of selectively energizing several individual segments and a common back electrode of the liquid crystal display with serial data using a microprocessor which outputs the serial data to be displayed and outputs a display clock pulse, making available the serial data in a serial/parallel converter for each segment of the liquid crystal display as inverted serial data, applying the serial data to be displayed for intervals of 0.05 second to 0.5 second responsive to the display clock pulse of the microprocessor (1,21) and inverting the serial data at ends of the intervals for the individual segments (17*a* . . . 17*g*) and for the back electrode (15) in response to the display clock pulse.

2. Method of statically actuating a liquid crystal display in accordance with claim 1, in which are the steps of inverting the serial data for the actuation of the individual segments and of the back electrode with a clock pulse having a frequency of 30 to 100 Hz (alternating voltage actuation), and inverting also the clock pulse of the alternating voltage actuation together with inverting of the display data at the end of each actuation.

3. Method according to claim 1 or 2, characterized in that the serial data to be displayed is outputted every 0.1 second anew by the microprocessor.

4. Circuit arrangement for the control of a liquid crystal display which comprises several segments and a common back electrode of the liquid crystal display for receiving serial data, a microprocessor emitting the serial data to be displayed, a serial-parallel converter which statically makes available to the liquid crystal display the serial data to be displayed for selected ones of the several segments and the back electrode, the microprocessor (1,21) emitting the serial data to be displayed for all segments and for the back electrode anew every 0.05 second to 0.5 second, including emitting the serial data to an inverter (4,24), and a bistable flip-flop (5,25) having at least two states, changing its witching state at an end of each emission of serial data and that in the one switching state of the flip-flop (5,25) the serial data is passed on unchanged from the microprocessor (1,21) to the serial-parallel converter (6,26) while in the other switching state of the flip-flop (5,25) the data from the microprocessor (1,21) is passed on via the inverter (4,24) to the serial-parallel converter (6,26).

5. Circuit arrangement for the static drive and control of a liquid crystal display according to claim 4 in which the drive and control of the individual segments and of the back electrode is inverted with a clock frequency of 30–100 Hz (alternating voltage control), another inverter (32) is present which inverts the cycle of the alternating voltage drive and control, and in the one switching state of the flip-flop (25), the cycle of the alternating voltage drive and control is passed on unchanged while in said other switching state of the flip-flop (25), the cycle of the alternating voltage drive and control is passed on via the inverter (32).

6. Circuit arrangement according to claim 4 or 5, characterized in that the microprocessor (1,21) emits the data to be displayed anew every 0.1 second.

7. Apparatus for actuating a liquid crystal display with recognition of functional errors comprising serial data output means for coupling serial data to a first gate means and concurrently sending the serial data to an inverter means providing an output of inverted serial data, data clock pulse means associated with the serial data and providing an output of a data clock pulse to a serial-parallel converter means, flip-flop means having at least two states, one state to maintain the first gate means normally open for passing the serial data from the first gate means to the serial-parallel converter means controlled in response to the data clock pulse, and further providing a potential on a back electrode of a liquid crystal display means also having selectively activated segments responsive to the serial-parallel converter means, display clock pulse means providing a first short impulse to the serial-parallel converter means to retrieve the serial data in the serial-parallel converter and passing the serial data to a selective set of the activated segments of the liquid crystal display means and concurrently actuating the flip-flop means to another state to actuate the first gate means closed for terminating the transmission of the serial data to the serial-parallel converter means and as well removing the potential on the back electrode of the liquid crystal display means, second gate means opened in response to an other state of the flip-flop means for passing the inverted serial data to the serial-parallel converter means, and the serial-parallel converter means in response to a second short impulse of the display clock pulse means to the serial-parallel converter means to retrieve the inverted serial data in the serial-parallel converter and passing the inverted serial data to the selected set of the actuated segments of the liquid crystal display means which has now the potential on the back electrode thereof removed by the flip-flop means so that in absense of error in the serial data, a common difference of potential is repeated on the same selective set of the activated segments.

* * * * *